US008290886B2

(12) United States Patent
George et al.

(10) Patent No.: US 8,290,886 B2
(45) Date of Patent: Oct. 16, 2012

(54) TRAINABLE HIERARCHICAL MEMORY SYSTEM AND METHOD

(75) Inventors: Dileep George, Menlo Park, CA (US); Jeffrey C. Hawkins, Atherton, CA (US)

(73) Assignee: Numenta, Inc., Redwood City, CA (US)

( * ) Notice: Subject to any disclaimer, the term of this patent is extended or adjusted under 35 U.S.C. 154(b) by 0 days.

(21) Appl. No.: 13/333,865

(22) Filed: Dec. 21, 2011

(65) Prior Publication Data
US 2012/0109857 A1    May 3, 2012

Related U.S. Application Data

(63) Continuation of application No. 12/751,808, filed on Mar. 31, 2010, now Pat. No. 8,103,603, which is a continuation of application No. 11/147,069, filed on Jun. 6, 2005, now Pat. No. 7,739,208.

(51) Int. Cl.
*G06E 1/00* (2006.01)
*G06E 3/00* (2006.01)
*G06F 15/18* (2006.01)
*G06G 7/00* (2006.01)

(52) U.S. Cl. .................................................. 706/16
(58) Field of Classification Search ................. None
See application file for complete search history.

(56) References Cited

U.S. PATENT DOCUMENTS

| | | | |
|---|---|---|---|
| 6,028,608 A | 2/2000 | Jenkins | |
| 6,144,711 A | 11/2000 | Raleigh et al. | |
| 7,613,675 B2 | 11/2009 | Hawkins et al. | |
| 7,620,608 B2 | 11/2009 | Jaros et al. | |
| 7,624,085 B2 | 11/2009 | Hawkins et al. | |
| 7,739,208 B2 | 6/2010 | George et al. | |
| 7,899,775 B2 | 3/2011 | George et al. | |
| 7,904,412 B2 | 3/2011 | Saphir et al. | |
| 7,937,342 B2 | 5/2011 | George et al. | |
| 7,941,389 B2 | 5/2011 | Marianetti, II et al. | |
| 7,941,392 B2 | 5/2011 | Saphir | |
| 7,983,998 B2 | 7/2011 | George et al. | |
| 8,037,010 B2 | 10/2011 | Jaros et al. | |

(Continued)

OTHER PUBLICATIONS

'Invariant pattern recognition using Bayesian inference on hierarchical sequences': George, Stanford, Oct. 2004.*
'A hierarchical bayesian model of inveriant pattern recognition in the visual cortex': George, IEEE, Aug. 2005.*
U.S. Appl. No. 13/415,713, filed Mar. 8, 2012.
U.S. Appl. No. 13/227,355, filed Sep. 7, 2011.
U.S. Appl. No. 13/218,202, filed Aug. 25, 2011.
U.S. Appl. No. 13/218,194, filed Aug. 25, 2011.
U.S. Appl. No. 13/218,170, filed Aug. 25, 2011.

(Continued)

*Primary Examiner* — Kakali Chaki
*Assistant Examiner* — Peter Coughlan
(74) *Attorney, Agent, or Firm* — Fenwick & West LLP (57) ABSTRACT

Memory networks and methods are provided. Machine intelligence is achieved by a plurality of linked processor units in which child modules receive input data. The input data are processed to identify patterns and/or sequences. Data regarding the observed patterns and/or sequences are passed to a patent module which may receive as inputs data from one or more child modules. the parent module examines its input data for patterns and/or sequences and then provides feedback to the child module or modules regarding the parent-level patterns that correlate with the child-level patterns. These systems and methods are extensible to large networks of interconnected processor modules.

15 Claims, 7 Drawing Sheets

U.S. PATENT DOCUMENTS

| | | | |
|---|---|---|---|
| 8,103,603 | B2 | 1/2012 | George et al. |
| 8,112,367 | B2 | 2/2012 | George et al. |
| 8,121,961 | B2 | 2/2012 | George et al. |
| 8,219,507 | B2 | 7/2012 | Jaros et al. |
| 2002/0161736 | A1 | 10/2002 | Beygelzimer et al. |
| 2004/0142325 | A1 | 7/2004 | Mintz et al. |
| 2005/0002572 | A1 | 1/2005 | Saptharishi et al. |
| 2005/0028033 | A1* | 2/2005 | Kipersztok et al. ............. 714/27 |
| 2006/0093188 | A1 | 5/2006 | Blake et al. |
| 2006/0161736 | A1 | 7/2006 | Huang |
| 2006/0184462 | A1 | 8/2006 | Hawkins |
| 2007/0005531 | A1 | 1/2007 | George et al. |
| 2007/0019754 | A1 | 1/2007 | Raleigh et al. |
| 2007/0192268 | A1 | 8/2007 | Hawkins et al. |
| 2007/0276744 | A1 | 11/2007 | Burke |
| 2007/0276774 | A1 | 11/2007 | Ahmad et al. |
| 2008/0183647 | A1 | 7/2008 | Hawkins et al. |
| 2008/0201286 | A1 | 8/2008 | Hawkins et al. |
| 2008/0208966 | A1 | 8/2008 | Edwards et al. |
| 2009/0313193 | A1 | 12/2009 | Hawkins et al. |
| 2010/0049677 | A1 | 2/2010 | Jaros et al. |
| 2011/0225108 | A1 | 9/2011 | Hawkins et al. |

OTHER PUBLICATIONS

Numenta, Inc., "Zeta1 Algorithms Reference, Version 1.0," Mar. 1, 2007, thirty-seven pages.

Hawkins, J. et al., "Hierarchical Temporal Memory, Concepts, Theory, and Terminology," Numenta, May 10, 2006, pp. 1-19.

Rojas, R., "Neural Networks, A Systematic Approach," Springer-Verlag, 1996, pp. 20-21, 110-112 and 311-319.

* cited by examiner

TRAINABLE HIERARCHICAL MEMORY SYSTEM AND METHOD

RELATED APPLICATIONS

This application is a continuation of, and claims benefit and priority to U.S. patent application Ser. No. 12/751,808, filed on Mar. 31, 2010 and titled "Trainable Hierarchical Memory System and Method," which is a continuation of U.S. patent application Ser. No. 11/147,069 filed on Jun. 6, 2005 and titled "Trainable Hierarchical Memory System and Method," which are incorporated by reference in their entirety. This application is also related to U.S. patent application Ser. No. 11/010,243, filed on Dec. 10, 2004.

BACKGROUND OF THE INVENTION

1. Field of the Invention

The present invention relates to the field of memory systems and machine intelligence. In particular the present invention relates to machine learning 2. Description of Related Art Recognizing objects despite different scalings, rotations and translations axe tasks that humans perform readily without conscious effort. However, this remains a very difficult problem for computer vision algorithms. Likewise, the human brain is very adept at recognizing and/or predicting sequences of sounds, such as for example melodies and speech, based on prior learned experience. Somato-sensory inputs to the human brain are also handled quickly and efficiently by recognizing invariant patterns experienced by nerve endings in the skin. The current state of the art in machine intelligence cannot even begin to duplicate these abilities.

One approach to implementing invariant pattern matching for visual processing involves storing a prototype of an object in a machine memory and then attempting to match it with an incoming pattern using a variety of transformations. The number of operations required for such a match would in general be exponential in the number of object categories and transformations. The number of operations could be reduced by storing a large number of prototypes for each category and men using a distance metric to categorize objects based on the distance to a nearest prototype. However, its well known that methods based on simple distance metrics do not generalize well. Deformable templates may overcome some of the problems of patterns for the same pattern of motion. Nonetheless, even simple recognition of visually perceived objects is beyond the current state of the art in artificial intelligence, even using the fastest computer processors available.

Rigid objects may be thought of as the underlying causes for persistent visual patterns. Thus learning persistent spatio-temporal visual patterns corresponds to learning rigid objects. In a similar manner, learning of persistent audible sound patterns corresponds to learning about the causes of these sounds and learning of other perceived sensory patterns corresponds to learning about the invariant underlying causes of the perceptions. Associating these patterns with the cause corresponds to invariant pattern recognition. Current technologies do not provide viable methods or systems for machines to accomplish these learning tasks.

SUMMARY OF THE INVENTION

The present invention provides numerous advantages and address a number of deficiencies in prior art intelligent processor methods and systems. The following brief summary of some of the claimed embodiments should not be construed as limiting on the scope of the claims.

In one embodiment, the present invention provides a memory network of interconnected processing modules. The memory network comprises a child processing module and a parent processing module. The child processing module may receive input data and generate lower level characterization data that represent patterns and/or sequences found in the input data. The child module may further output the lower level characterization data. The parent processing module may receive the lower level characterization data and generate higher level characterization data that represent patterns and/or sequences found in the lower level characterization data. The parent module may also provide feedback to the child module for linking the higher level characterization data to the lower level characterization data.

In another embodiment, the present invention provides a method for training a memory network. The method may comprise the steps of receiving training data, generating lower level characterization data, outputting the lower level characterization data to a parent module, generating higher level characterization data that represent patterns in the lower level characterization data, and providing feedback to the child module for linking the higher level characterization data to the lower level characterization data. The training data may comprise a world of patterns at a child processing module In another embodiment, the present invention provides an interpretive framework method for training a memory system. The method may comprise the steps of processing a discrete stream of input data at each of two or more lower tier processing modules, passing the lower tier sequence identity label from each the two or more lower tier processing modules to an upper tier processing module; processing the lower tier sequence identity label in the upper tier processing module, and providing feedback to the lower tier modules regarding the relative and/or absolute frequency of one of the upper tier sequences in relation to the occurrence of a specific lower tier sequence. The processing at each lower tier processing module may comprise identifying and labeling lower tier patterns and/or sequences in the input data stream. The processing of the lower tier sequence identity data comprising identifying and labeling upper tier sequences and quantifying die relative and/or absolute frequency of the upper tier sequences In another embodiment, the present invention provides a data processing structure. The data processing structure may comprise an upper tier processing module, a first and a second lower tier processing module, and two-way links that separately connect the first lower ties processing module to the upper tier processing module and the second lower tier processing module to the upper tier processing module. Each of the first and the second lower tier processing modules may receive a discrete stream of input data. The first and the second lower tier processor modules may each comprise a memory and a processor that categorizes the received input data into discrete categories and identifies, labels, and quantifies the relative and/or absolute frequency of sequences observed in the categorized input data.

In another embodiment, the present invention provides a memory network. The memory network may comprise a first lower tier processing module having a first receptive field size and a second lower tier processing module having a second receptive field size, an upper tier processing module having a third receptive field size that at least as large as the sum of the first and the second receptive field sizes, external inputs feeding a discrete input data stream to each of the first and the second lower tier processing modules, and data links between the upper tier processing module and the lower tier processing modules. The data links may pass processed lower tier sequence information from one of the first tier processing modules to the second tier processing module and feedback information from the second tier module to the one first tier processing module. The lower tier sequence information may comprise an identity label and a relative anchor absolute frequency for each data sequence experienced by the one first tier processing module and the feedback information comprising a relative and/or absolute frequency correlation between each data sequence experienced by the one first tier processing module and a second tier sequence experienced by the second tier module.

BRIEF DESCRIPTION OF THE DRAWINGS

Various illustrative aspects and advantages of the present invention will become apparent upon reading the detailed description of the invention and the appended claims provided below, and upon reference to the drawings, in which:

DETAILED DESCRIPTION OF EXEMPLARY EMBODIMENTS

The present invention generally provides, among other advantages, systems and analytical methods for observing the world through one or more sets of sensors and constructing a model of the world. Here, "world" refers to the environment in which the system operates. A model of the world, such as that generated according to one or more of the various embodiments of the present invention, may have several uses. For example, such a model may be used for predicting the future patterns on a sensor, predicting one set of patterns from the observed values of another set of patterns, associating patterns with their underlying causes, or the like. Prediction of future events based on learning from observations of the world is a key aspect of intelligence and one that has so far eluded tire state of the art in artificial intelligence. The present invention differs substantially from, prior artificial intelligence systems and methods, largely because the intelligence exhibited by systems, methods, architectures, and the like according to embodiments of the invention is a more "natural" type of intelligence. In the present invention, human intelligence is not mimicked using overwhelming processor power or memory storage capacities. Rather, a system of connected processing modules may intelligently and efficiently process input data to observe the most frequent and recurring patterns and sequences of patterns in the input data, create a model or a belief structure that interprets the input data, and then use this model or belief structure to anticipate, predict and dynamically process new input data. A system of connected modules as used in describing the present invention may be a hierarchy, a tree hierarchy, or the like. Alternatively, the present invention may be practiced, in a manner that does not rely on a rigid, ordered structure.

A system that constructs and/or uses a model of the world as a means for interpreting input data about the world, may generally has a set of sensors to interface with the world. These sensors provide measurements of various quantities, qualities, or other characteristics or metrics of the world. The sensors may measure various physical quantities as they vary over some other set of physical quantities. For example, the retina. In humans may be thought of as a sensor that measures the intensity of light as a function of space and time. In an embodiment of the present invention, sensors may include any known or as yet unknown apparatus, system, method, or the like for collecting data that may be processed to construct a model or belief system.

One type of prediction that may be applied using the present invention involves obtaining the value of one unknown variable from the value of another known variable. In the case of predicting forward in time, the known value of time is used to obtain the value of some other unknown quantity. More generally, this form of prediction may be employed between any set of known and unknown variables. The form of prediction that will be employed by an intelligent system may generally depend on the demands of the given situation in which predictions are generated.

In predicting one set of variables based on another set, an intelligent system may employ information about correlations and causations between these variables previously observed by the system. Based, on observations of its sensors, the system may construct a knowledge base of correlations among the variables. Performing this construction in such a way that exploits the structure of the world may be advantageous in terms of computations, storage and generalization efficiency. Many of the properties of the human visual system may be understood in terms of this model. Humans are very good at recognizing objects despite different scalings, rotations, translations and distortions. Relative motion of an object being observed, and the observer may cause the visual pattern experienced by a visual sensor observing the object to vary continuously while the underlying cause for the observed patterns—the object itself—remains unchanged. The visual sensor is the retina for a human, but in a non-limiting embodiment of the present invention it may be some visual input device, such as for example a camera, a light sensor, or any similar device. Rigid objects can be thought of as the underlying causes for persistent visual patterns that may be experienced in observing an object. Thus, learning persistent patterns on the visual sensor corresponds to learning objects in the "world." In its effort to predict the sensory inputs, the human cortex, and also embodiments of the present invention, learn the causes of the patterns observed by a sensor and associate the patterns with the underlying causes.

Thus, the different patterns produced by relative motion are associated with their underlying causes. This corresponds to invariant pattern recognition.

In a manner similar to processing of visual inputs, sounds may be processed by identifying and naming sequences of sound patterns perceived temporally. For example, for melodies and speech, sequences of notes and/or words may be categorized. Invariance in perceived sounds may be thought of more as relative invariance—melodies may be played in different keys such that while the actual notes played do not stay constant, the tonal step between sequential notes does. The auditory sensor is the ear for a human, but in the present invention it may be some auditory input device such as for example a microphone, pressure sensor, or any similar device. Other sensory perceptions such as touch may be processed in a similar manner according to the present invention as described in greater detail below. As noted above, the present invention is also extendable to any other kind of data input or inputs that characterize the environment or "world" in which die system operates.

One advantage of the present invention is the development of an interpretive framework and hierarchical processing system through which a system, may be trained via observation, categorization, and sequence processing of input data such that the system is later able to understand and make predictions about new observations of data that are not identical to those presented during the training phase. Unlike presently available artificial intelligence systems, architectures, and methods, a memory or other processing system according to one or more embodiments of the present invention may be initiated as a "tabula rasa." in other words, unlike a standard artificial intelligence system, a memory or processing system according to die present invention need not be pre-programmed with information describing the environment with which it might interact or the data it may be required to process. Rather, such a memory or processing system may "learn" about the environment or the input data presented to it through observation and recognition of patterns and/or sequences of patterns in the input data. In this way, a memory or processing system is able to interpret sensory or other data inputs that are related, though not identically, to phenomena, experiences, patterns, sequences, and the like that it has previously experienced.

Figure 1:
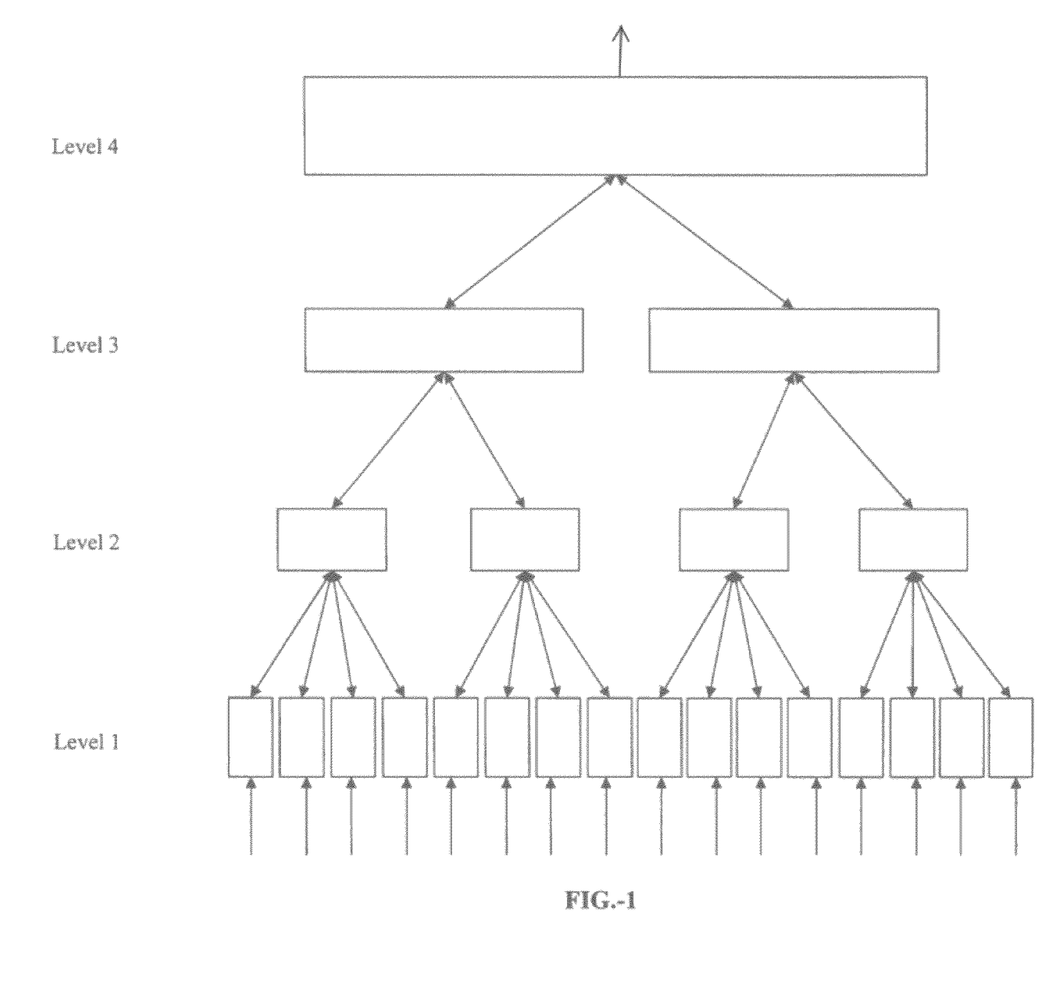
FIG. 1 is a schematic representation of an example hierarchical memory system having four levels according to one embodiment of the present invention.

In one embodiment, the present invention provides hierarchical memory systems, architectures, and methods. Additionally, the present invention optionally provides learning and recognition algorithms that exploit the hierarchical structure of such a system, architecture, or method. Each of the levels in a hierarchical structure according to embodiments of the invention may have one or more processing modules. A processing module may have several child processing modules and one parent processing module. Alternatively, a processing module may have more than one parent processing module. In a further embodiment, the processing modules may be arranged in a tree structure, such as for example that shown in FIG. 1. The hierarchical structure of FIG. 1 includes Levels 1 through 4, however, one of ordinary skill in the art should readily understand that a hierarchical structure according to the present invention may include two or more levels or tiers. The lowest level or tier in FIG. 1, which includes the largest number of modules, is labeled Level 1. Successive levels moving up the hierarchical structure are numbered sequentially (Level 2, Level 3, etc.) for clarity. Use operation of a module and its processing algorithms are independent of the source of the inputs to the module. The inputs to a module may be a combination of outputs several modules at a lower level of the hierarchy, or direct sensory input or a combination of the above. These combinations may be a simple concatenation or any other form of combination of data values. While FIG. 1 shows a hierarchical tree structure with each module at a given level communicate with only one parent module at the next higher level, this example is not intended to be limiting on the scope of the invention in any way. Lower level modules may communicate with multiple higher level modules, and this communication is not limited to modules at the next highest level.

As noted above, the present invention is also applicable to systems, methods, and architectures for processing input data from other than visual sensors. For example, a hierarchical structure with auditory or some sort of tactile inputs to the processing modules at Level 1 is within the scope of the invention. Alternatively, hierarchical processing may be applied to a system with more than one type of sensory input. Furthermore, the input data need not be directly related to a "human" sense at all. Data inputs to Level 1 of a hierarchical system according to one or more embodiments of the present invention may include, but are not limited to, measurements from a sonar array, measurements from weather stations, location data such as from a global positioning system, recordings from heat and vibration sensors distributed in a plant, measurements of internet traffic over time on various links, and the like.

Figure 2:
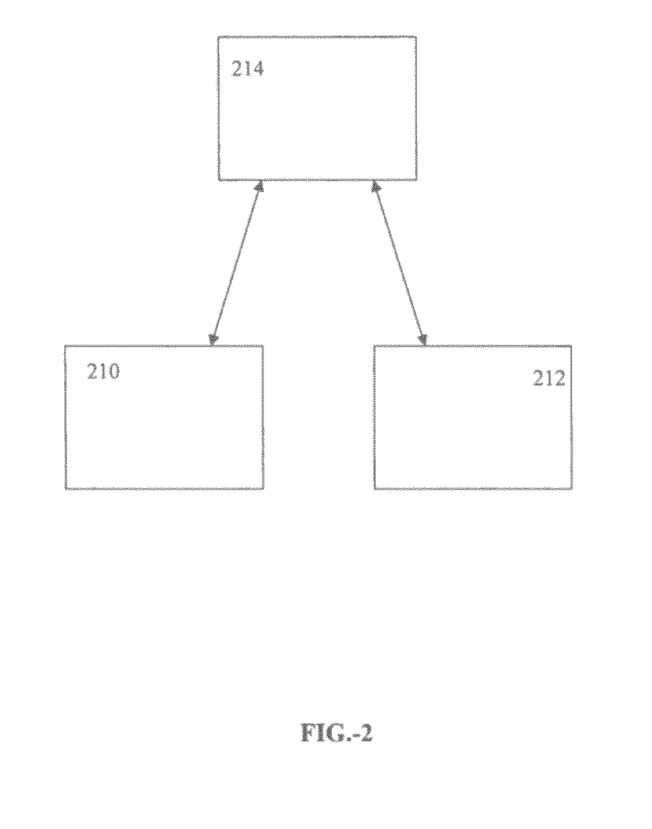
FIG. 2 is a schematic representation of a two level feedback/feed forward system comprising two child modules and a parent module according to one embodiment of the present invention.

Reference is made throughout this document and those it incorporates by reference to one embodiment of the present invention that comprises a multi-tiered hierarchical structure. In fact, however, this embodiment may be genericized as a two-level hierarchical structure comprising a first lower tier processing module 210, a second lower tier processing module 212, and an upper tier processing module 214. The upper tier processing module 214 receives input from, and provides feedback to the first 210 and second 212 lower tier processing modules. Such a system may be conceptualized as shown in FIG. 2. This system is presented as a representative only for the convenience of describing it. As noted above, any number of hierarchical arrangements fall within the scope of the present invention. In addition, non-hierarchical embodiments comprising a plurality of interconnected processing modules that are not arranged hierarchically are also within the scope of the invention. In general, a module in the network can receive its inputs from any other module in the network. A module in the network will send feedback connections to all modules in the network from which it receives an input.

Figure 3:
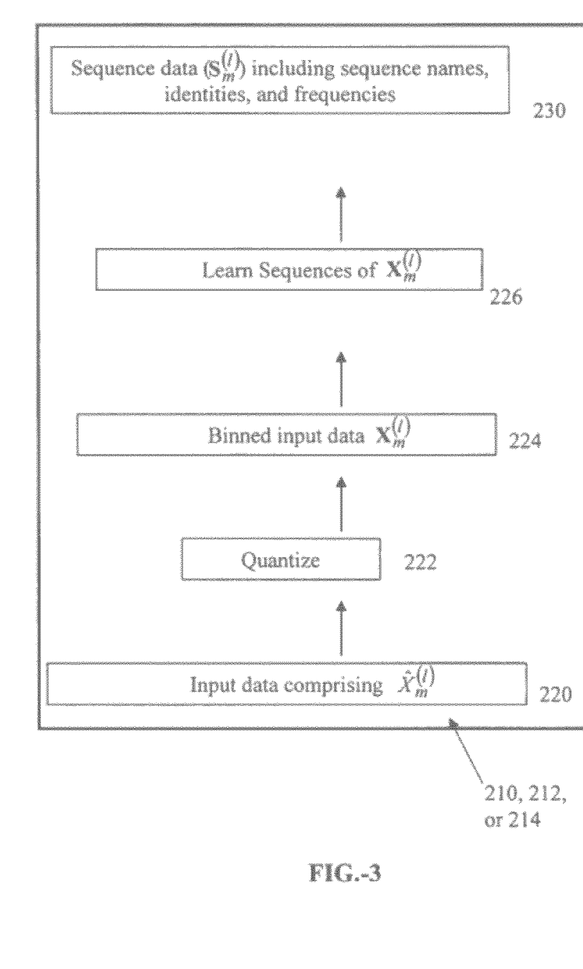
FIG. 3 is a block diagram showing processes occurring within a processing module according to one embodiment of the present invention.

With, reference to FIG. 2 and FIG. 3, each of the processing modules in the hierarchy generally perform fee same internal functions. This includes both the lower tier processing modules 210, 212 and the upper tier processing module 214. Although the modules may use the same processing algorithms, by virtue of their position in the network, they receive different forms of input and feedback data and therefore learn and represent different aspects of the world. For example, if the two-level hierarchical structure shown in FIG. 2 represents a portion of the first and second levels in the hierarchical structure shown in FIG. 1, then die two lower tier processing modules 210, 212 could receive as their data inputs, for example, one or more of the data types listed above or the like. If the two-level hierarchical structure shown in FIG. 2 were to represent, for example, a portion of the second and third levels in the hierarchical structure shown in FIG. 1, then the two lower tier processing modules would receive as input data processed sequence data from two or more processing modules at level 1.

FIG. 3 illustrates the internal processing steps performed by each processing module. A processing module receives input data as a raw data set $\hat{X}_m^l$ where l denotes the level of the hierarchy and m denotes the module within the level l 220. As noted earlier, this input may be a combination of the outputs of several other modules or a raw sensory input or a combination of both. This input may belong to a finite or an infinite set and may be continuous or discontinuous.

In one embodiment, the first step in the processing of the input data is a form of quantization of the input data. The quantization function may be of any form, such as for example a learning vector quantization, hamming distance quantization, K-nearest neighbor clustering or any other method. This quantization function splits the data into different clusters and assigns a cluster center to each of the clusters. The clusters may be overlapping or non-overlapping. In the quantization step or function, the raw input data set $\hat{X}_m^l$ is binned or categorized to provide a quantized or clustered data set $X_m^{(l)}$ 224. Even if the set $\hat{X}_m^l$ were continuous and infinite, the resultant set $X_m^{(l)}$ of quantized data would then be a finite and discrete set. An extreme case of a quantization, function, would be identity mapping where no quantization is performed on $\hat{X}_m^l$, for example when $\hat{X}_m^l$ is already in the desired form.

Once the Input data set $\hat{X}_m^l$ is quantized, any particular input $\hat{x}_m^l$ in the data will have a corresponding entry in the set $X_m^{(l)}$. This, in general, is an example of many-to-one mapping. Once this mapping is established, the processing module continues to observe Its input $\hat{x}_m^l$ and their corresponding $X_m^{(l)}$ to learn further structure in the data.

The occurrence of elements of the set $X_m^{(l)}$, as driven by the inputs $\hat{X}_m^l$, is further observed and fee module learns the sequences of the various binned data in $X_m^{(l)}$ 226. This learning leads to the creation of a set of sequences $S_m^{(l)}$ in which individual sequences $s_{m,j}^{(l)}$ are identified and labeled and their frequency of occurrence is quantified 230. The subscript j denotes an individual sequence. This process also occurs at module m+1, which in the example of FIG. 2 is the second first tier processing module 212. In one embodiment, the sequences may be constructed as a function of time by observing consecutive occurrences of the elements of the set $X_m^{(l)}$. However, one of ordinary skill in the art should readily understand from the teaching provided herein that it is possible to construct sequences as a function of any independent variable that may be measured.

Figure 4:
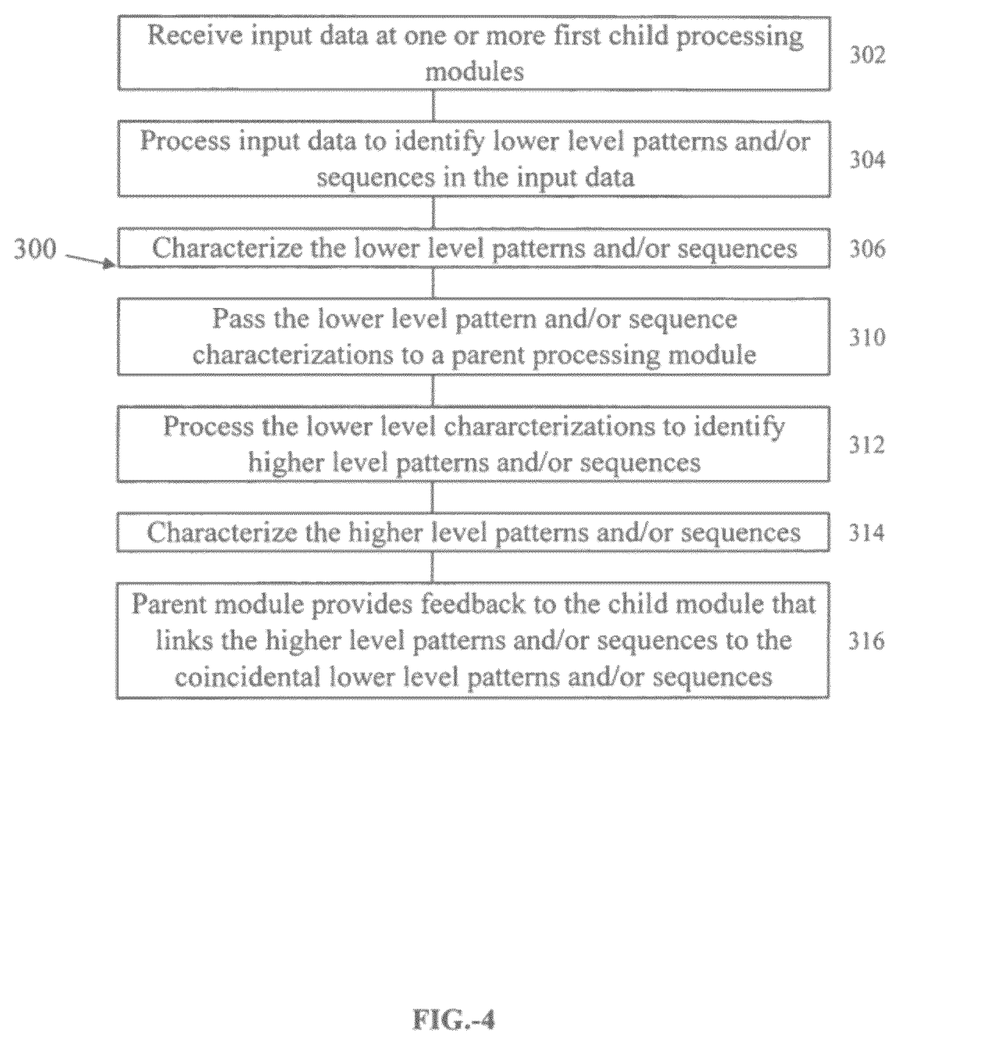
FIG. 4 is a flow chart outlining the basic steps in constructing a model of the world In accordance with one embodiment of the present invention.

More generally, FIG. 4 shows a flow chart 300 outlining basic steps of a method for practicing various embodiments of the present invention. Input data is received at one or more first child processing modules 302. The input data may be quantized as discussed above. Next, the input data are processed to identify lower level patterns and/or sequences in the input data 304. The lower level patterns and/or sequences are characterized 306. the characterization may include one or more of labeling the identified patterns and/or sequences, tabulating statistics, and the like. The statistics may describe the frequency with which the lower level patterns and/or sequences occur at the child module. Hie lower level patterns and/or sequence characterizations are passed to a parent processing module 310. The parent processing module processes the lower level characterizations to identify higher level patterns and/or sequences 312. It is possible, though not required, that the parent processing module receives and processes child output data from more than, one child processing module. The parent processing module characterizes the higher level, patterns and/or sequences 314. This characterization may include labeling patterns and/or sequences observed in the lower level data, tabulating frequency statistics, and/or the like. The parent processing module then provides feedback to the child processing module that links the higher level, patterns and/or sequences to the coincidental lower level patterns and/or sequences 316. This feedback may take many forms. In general, the feedback provides the child module with sufficient information to predict what higher level patterns and/or a sequences are most likely to be recognized by the parent module based on a lower level pattern and/or sequence observed by the child, module.

The sequences that a module learns may have different lengths. These lengths could for example be set as a design parameter or alternatively may be learned though observations of the input data. Alternatively, a module may decide to keep in its memory only some of the set of observed sequences. Different criteria may be used to select the set of sequences that a module stores. In one embodiment of the invention only those sequences which occur with a frequency greater than a threshold frequency of occurrence δ are stored. In this embodiment this data set may be learned by empirically observing the frequencies of occurrences of the sequences. This criterion automatically fixes the lengths of different sequences.

Every sequence that a module stores will be identified by a sequence index. Thus at the end of the sequence learning process a module contains a set of sequences and their identifiers. It is also possible to use other identifying mechanisms besides an index to uniquely identify a member of this set.

Once a module finishes learning the sequences of $X_m^{(l)}$ and encoding them as a set of sequences $S_m^{(l)}$, the module may continue to observe the world as seen through its inputs $\hat{X}_m^l$. A continuum of inputs $\hat{X}_m^l$ may produce within the module a sequence of $X_m^{(l)}$. Some of these sequences may correspond to the set of stored sequences within the module. When that happens, the module recognizes it as a stored sequence and produces the identifier $s_{m,j}^{(l)}$ corresponding to the sequence index j. This identifier is then sent to the output of the module. Different sequences may have the same starting segments and hence be confused with each other if only a part of the sequence is observed. Several methods can be used to overcome this. In one embodiment of the invention, the sequences may be stored such that no stored sequence is a sub-sequence of another stored sequence. In another embodiment, the output identifiers may include all of the stored sequences that matched the input sequence segment under consideration.

The module m at level l, referred to herein as module (l,m), may send its output to one or more "parent" modules. The next step in the learning process for module (l,m) generally involves learning observed sequences and elements in the context of the states of the parent module or modules (at level l+1) of module (l,m) In FIG. 2, the parent processing module at level l+1 is the second tier processing module 214. At any time, the inputs to this parent module may be the sequence identifiers from modules m and m+1 at level l. For example at time t, module (l,m) could send the sequence identifier $s_{m,j}^{(l)}$ and module (l,m+1) could send the sequence identifier $s_{m+1,k}^{(l)}$ indicating the occurrences of those corresponding sequences at their inputs. If module (l,m) and module (l,m+1) are the only modules sending their feed-forward outputs to the parent module 214, then, at the parent processing module 214, the set of sequence data from modules m and m+1 at level l may be combined to provide the "pattern" of input data for the parent processing module 214. In other words, the contemporary presentation of identifiers from the sequence data sets $S_m^{(l)}$ and $S_{m+1}^{(l)}$ present the set of raw input data $\hat{X}_m^{(l+1)}$ for the parent processing module 214 which is module m at level l+1.

Once the input to the parent module $\hat{X}_m^{(l+1)}$ is constituted, this module goes through the same learning procedure as the child modules in level l. First, a quantization process may be executed to obtain the set of quantization points $X_m^{(l+1)}$. The quantization points of the higher level module may be thought of as higher level causes in the world. This is because the higher level modules in general receive inputs from multiple lower level, child modules. The term "higher level causes" refers generally to larger scale patterns. For example, if a hierarchical, structure according to an embodiment of the present invention is used to process visual data such as from a set of two cameras, child module (l,m) might receive Input from a first camera while child module (l,m+1) receives input from a second camera. The parent module (l+1,m) would, receive processed data from the two child modules and therefore have a "higher level" view of the observed world due to data inputs from a larger section of the visual field than are experienced by the individual child modules. While it is advantageous to have a parent module receive inputs from multiple child modules, the scope of the present invention also includes embodiments in which one child module provides input data to a parent module and further when one child module provides input data to more than one parent module.

In one embodiment, the next stage in the learning process comprises learning the co-occurrences of patterns and sequences In a lower level module with the patterns or quantization points in the higher level modules. Once the quantization points are obtained in a higher level module (l+1,m), the occurrence of any input pattern may trigger a quantization point $x_{m,k}^{l+1}$ within that module. This information is fed back via the feedback connections to modules that send feed forward connections to module (l+1,m). What is fed back is an Identifier as to what higher level, quantization point or cluster center is active presently. This identifier could advantageously be the index of the quantization point in module (l+1,m). Since the quantization points or cluster centers of a higher level module depend on the outputs of all its "child-modules", this information is generally not locally obtainable by a child module.

The feedback information from a parent module may inform, a child module of the currently active cause/pattern/quantization-point in the higher level. A child module may use this information in one or more of several ways. In one embodiment of the invention, a child module may use this information to construct and update a conditional probability table encoding the occurrences of its own causes and/or quantization points given the occurrence of the higher level cause and/or quantization-point. In one example, this may be accomplished by constructing a table or matrix with rows corresponding to the feedback information received from the parent module and columns corresponding to the child module's own quantization function. The child, module may store a record of the elements of the sequence that have occurred in the immediate or recent past. Once a particular feedback information is received, it may be used to select a row of the feedback matrix, and the counts corresponding to the elements of the sequence which was observed in the immediate or recent past may be incremented in the corresponding columns of that row. After observing a diverse set of inputs for some period of time, the rows of this matrix may be normalized to obtain a conditional probability distribution (CPD) matrix $P(X_m^{(l)}|X_m^{(l+1)})$. An entry of this CPD matrix at the $i^{th}$ row and $j^{th}$ column indicates the probability of a quantization, point j in module (l,m) occurring given that a quantization point i occurs in module (l+1,m).

In another embodiment of the invention, a child module may use the feedback information to learn how frequently the sequences stored within that module occur in the context of the quantization points of the parent module or modules. In this case the matrix that may be structured as $P(S_m^{(l)}|X_m^{(l+1)})$ where row indices corresponded to the higher level quantization points, as discussed, above, and the column indices correspond to the sequences in the child module. In a further embodiment of the invention, the same feedback information may optionally be used to construct the matrix $P(X_m^{(l)} X_m^{(l)}|X_m^{(l+1)})$ in which the columns correspond to the transitions between the quantization points of the lower level module. Henceforth in this document, the short form $P(X_m^{(l)} X_m^{(l)}|X_m^{(l+1)})$ is used to denote the matrix $P(X_m^{(l)}(t)X_m^{(l)}(t+1)|X_m^{(l+1)}(t))$. One of ordinary skill in the art will readily understand that the descriptions included in this section with regards to mathematical constructs and formats are merely illustrative of various ways in which one or more embodiments of the present invention may be practiced. Although the information of these co-occurrences are encoded as CPD matrices in this example, it is also possible to encode them differently. For example, in a different embodiment of the current invention, these values may be stored un-normallzed as connection strengths of a list of connections.

The learning process as described above maybe employed between any modules that are connected In the network. In general, any module quantizes its inputs, form sequences of it and passes a representation for that sequence to other modules. A module also learns the probability distribution of its own quantization points or sequences under the context of feedback information it receives from other modules. These operations can be repeated in a hierarchy, starting with modules close to the sensory hierarchy and going successively away from the sensory input.

Figure 5:
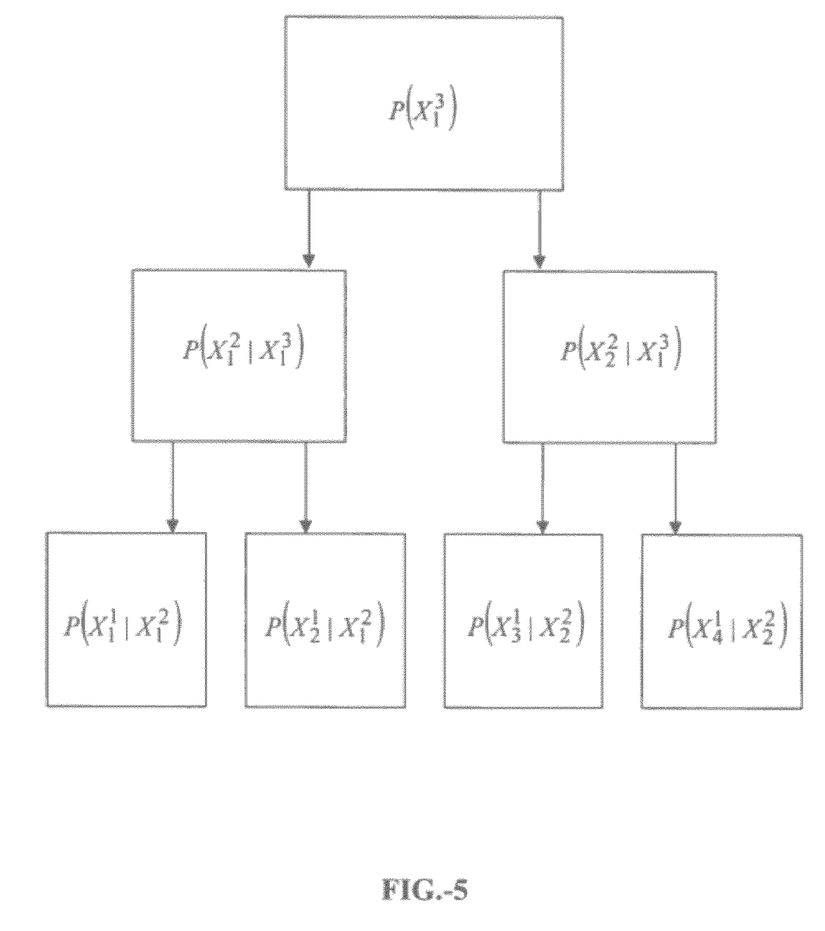
FIG. 5 is a schematic diagram showing a three-tiered hierarchical structure illustrating a Bayesian inference structure according to one embodiment of the present invention.

In an embodiment of the invention, a network comprises modules connected in a free structure with sensory inputs corning in at the bottom of the tree structure as shown in FIG. 5. By repeating the learning algorithm in such a hierarchy, a Bayesian Network structure such as the example shown in FIG. 5 may be obtained. Such a Bayesian network structure may decompose the world. Into a hierarchy of causes, each interlinked to one another. As this Bayesian network structure is obtained through learning by observing the world, it may be used to answer queries about the world. For example, for any new sensory data input at the lower levels of the hierarchy, the most likely cause for that pattern may be ascertained at the top module of the tree under this model. Such queries may be answered using a well known technique called Bayesian Belief Propagation.

Alternatively, with such a knowledge structure, queries may be formulated regarding the distribution of beliefs that may be observed at a module given a particular input. Such queries may also be answered through Bayesian Belief Propagation. The process of answering such queries in a Belief Network is generally known as inference. There are several well known techniques for inference in such a network. Some examples include Bayesian Belief Propagation, Clique Tree Inference, Variable Elimination etc.

As an example, a system according to one embodiment of the present invention may be exposed via visual sensors, such as for example a camera, a light sensor or the like, or in the case of a human, a retina, to a visual world. By exposing this system to continuously varying images in the visual world, the system may learn the structure of the visual world and decompose it into a hierarchy of causes. At the top of the hierarchy, the system may automatically discover visual, objects which correspond to the underlying cause for visual patterns. Such a system may then be used for pattern recognition. As an example, given a new pattern, on its sensors (an input image), the system may be asked to find the most probable cause for that pattern. This corresponds to object recognition. Alternatively, the system may be asked to fill-in or de-noise an input image according to the statistics of the world known to the system.

Another application of a learned system would be to predict forward in time, or in any other variable. In an embodiment of the system a learned system was used to predict forward in time. In that embodiment, every module (l,m) in the system used, the feedback information from, higher levels to obtain the conditional transition probability matrix $P(X_m^{(l)}X_m^{(l)}|_m^{(l+1)})$.

If, at time t the module (L,m) at the top of the hierarchy predicts the probability distribution of $X_m^L(t+1)$ assuming that it knows $X_m^L(t)$, $X_m^{L-k}(t)$ for all m and k, this may be accomplished as, $$Pred(X_m^L = P_{X_m^L(t+1)|X_m^L(t), X_n^{L-k}(t), \forall k, n} = P_{X_m^L(t+1)|X_m^L(t)} \quad (1)$$

Thus the module (L,m) at the very top of the hierarchy needs only its locally stored matrix to make predictions.

Similarly, module (L−1,r) which is a direct child of module (L,m) may make a prediction about the probability distribution of its next state according to $$Pred(X_r^{L-1}) = \sum_j P_{X_r^{L-1}(t+1)|X_m^L(t+1)=j, X_r^{L-1}(t)} P_{X_m^L(t+1)=j|X_m^L(t)} \quad (2)$$

Note that the second term on the right hand side of equation 2 is the same as the predictive probability distribution calculated by module (L,m) In equation 1. Thus, for module (L−1, r) to make a prediction about its next state, it combines information computed by its parent module (L,m) with its own locally stored matrix $P_{X_r^{L-1}(t+1)|X_m^L(t+1)=j, X_r^{L-1}(t)}$. The $Pred(X_m^L)$ information computed by module (L,m) is fed down to its child modules for those modules to make predictions.

For the case when after having observed a sequence states from a child modules (L−2, n) and (L−2, k) the module (L,r) decides to update its estimate of its current state, the optimal estimate of the current state is obtained according to the MAP rule.

$$\hat{X}_r^{L-1}(t+1) = \arg\max_{X_r^{L-1}(t+1)} P_{X_n^{L-2}(t_0+1:t+1)|X_r^{L-1}(t)},$$
$$X_n^{L-2}(t_0) P_{X_k^{L-2}(t_0+1:t+1)|X_r^{L-2}(t_0)} P_{X_r^{L-1}(t+1)|X_r^{L-1}(t+1)},$$
$$X_m^L(t) \quad (3)$$

where $X_n^{L-2}(t_o+t+1)$ is a sequence of states extending from time $t_0$ to time t+1. In the equation 3, the terms within square brackets can be computed by modules (L−2, n) and (L−2,r) using local information using the prediction information they receive from their parent modules. If these modules send up a set of winning arguments then the module (L−1,r) may finish the arg max computation exactly and decide the most likely state based on that information.

Figure 6:
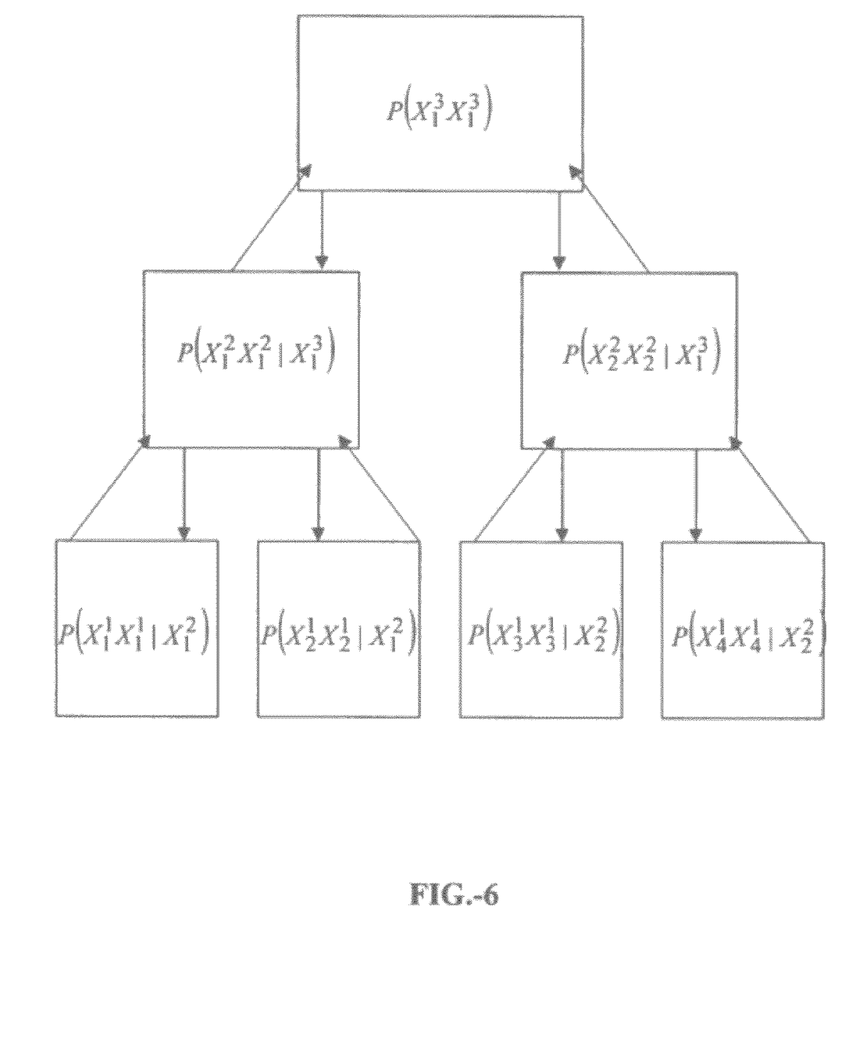
FIG. 6 is a schematic diagram illustrating Bayesian inference-prediction architecture for a hierarchical memory according to one embodiment of the present invention.

The analysis above shows that the idea of hierarchical sequences and the idea of a hierarchical cortex with feed forward and feedback connection are consistent with, each other in a Bayesian inference-prediction framework. The feed forward pathways are used to carry the inferences made based on current as well as locally stored past observations. The feedback pathways carry expectations/predictions to lower levels as shown in FIG. 6. Higher level modules may have converging inputs from multiple lower level modules. Thus, feedback information from, a higher level of the hierarchy may be used as context to interpret/disambiguate an observed pattern at lower level. Recognition occurs when the highest level converges on a cause by disambiguating several parallel and competing hypotheses at all levels. For the purposes of the analysis above, first order markovity was assumed to avoid the need for carrying too many terms in the conditional probability calculations. Similar conclusions as above would be drawn if this assumption is relaxed.

As a further advantage, the present invention also encompasses a system and/or method by which sensory data or other data inputs from more than one media may be processed hierarchically. Just as the human brain may make associations between the visual observations of an object and how it feels and/or sounds, a hierarchical memory or processing system, according to various embodiments of the present invention is also capable of this level of processing. To accomplish such an integrated system, for example a visual hierarchy and an auditory hierarchy operating according to one or more embodiments of the present invention are linked at a further level. Top level processing modules in the visual and auditory hierarchical structures provide feed-forward and feedback links to a parent processing module or modules that associate visual patterns or sequences with temporally coincident auditory patters or sequences. Conditional probability functions are developed through learning in the same manner as for single-media sensory inputs.

ILLUSTRATIVE EXAMPLES

A number of examples of various possible embodiments and implementations of the present invention are described below. These examples are intended for illustration purposes only, and are not intended to limit the scope of the present invention in any way.

Example 1

Hierarchical Structure for Visual Processing

For sensory input, such as for example for visual perception, the Level 1 processing modules have small receptive fields compared to the size of the total image. These Level 1 processing modules receive their inputs from a small patch of the visual field. Several such Level 1 processing modules tile the visual field, possibly with overlap. A processing module at Level 2 is connected to and interchanges data with one or more adjoining processing modules in Level 1. Thus a Level 2 processing module covers more of the visual field compared to a Level 1 processing module. However, a Level 2 processing module receives sensory information only through a Level 1 processing module. In this embodiment, there is no direct sensory input to processing modules at Level 2 or higher. However, as discussed above, it is possible and may even e desirable to provide some direct sensory input data to modules at tiers above the lowest tier in the hierarchy. This pattern is repeated at successively higher levels of the hierarchical structure. Thus the receptive field size of each processing module increases at successive levels or tiers moving up the hierarchical structure, and there are successively fewer processing modules at each higher level, or tier. In the illustrative hierarchical structure shown In FIG. 1, one processing module at Level 4 covers the entire sensory field, by pooling inputs from its child processing modules at Level 3, which pool inputs from their child processing modules at Level 2, which in turn pool inputs from their child processing modules at Level 1.

Example 2

Learning and Recognition of Line Drawings in a Visual Field

Various aspects and advantages of embodiments of the present invention were demonstrated by a simulation executed for a data, set of line drawing movies. These movies were created by simulating straight-line motions of hue drawings of objects belonging to 91 classes. There were 10 exemplar images of different scales for each category. Each Image was of size 32 pixels by 32 pixels. The movies were created by picking a random category index and then moving the picture belonging to that category in straight lines. Once a particular direction of motion was picked, the object moved In that direction for a minimum of 10 time steps before changing directions. An object that was nicked, remained in the field of view for at least 30 time steps before a new object category was picked at random. This way of simulating a movie gives us an infinitely long input sequence to verify various performance aspects of the algorithms described above. We describe the results of these investigations in the following subsections.

All of these simulations are based on a hierarchical arrangement of modules as described earlier In this example, the simulation system included 3 levels. The lowest level, Level 1 (L1), included modules receiving inputs from a 4×4 patch of images. Sixty four L1 modules tiled an input image. Learning started at L1 and proceeded to the higher levels. Each Level 2 (L2) module receives its inputs from 4 adjoining L1 modules. There were a total of 16 L2 modules. A single Level 3 (L3) module received all the information from these L2 modules.

The full network was trained up according to the algorithm described earlier. Recognition is performed according to the inference procedure using Bayesian Belief Propagation as was described, earlier. An input image to be recognized is converted to uncertain evidence using a hamming distance metric on each module (at the level of 4×4 pixels) as described in section 4. Recognition was defined as obtaining the most likely explanation (MPE) of the evidence given the conditional probabilities that we learned, on the graph.

Figure 7:
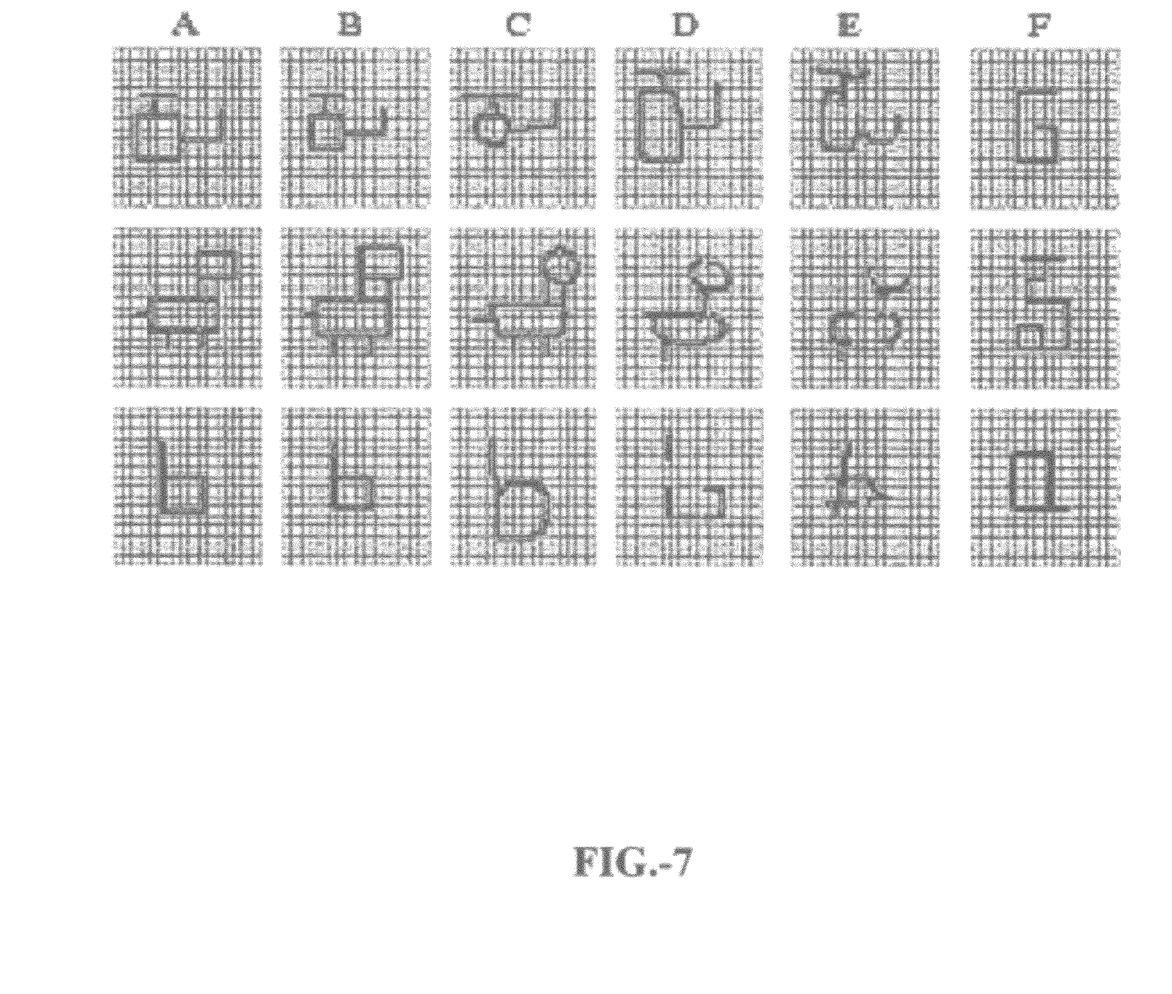
FIG. 7 is a series of images used to train and test an image recognition program illustrating various embodiments of the present invention. Examples of images used to train and test the invariant pattern recognition system.

The system exhibited robust recognition performance invariant to large scale changes, deformations, translations and noise. FIG. 7 shows examples of correctly recognized images. The rows correspond to 3 out of the 91 categories for which the system was trained. Columns A and B correspond to the two different images of a category that were used for training. Columns C and D are examples of test patterns for which the system recognized the image category correctly. Note that the system shows a high degree of shift, scale and distortion invariance. Column E gives examples of patterns for which the system made an error in recognition, and column F gives the category the column E pattern was incorrectly classified as.

Note that some categories are recognized irrespective of a flip about the vertical axis. This is because those categories included sequences which had a flip as a part of the training sequences. This shows the capability of the algorithm to learn the transformations it is exposed to during the training. If the input is ambiguous, a system or method according to the present invention may gather further information from the input by making small eye movements. Many psycho-physical studies show that recognition performance is greatly hampered when eye movements are not allowed. Between the eye-movements, the correct hypothesis would remain stable while the competing incorrect hypotheses will vary in a random manner. Our system exhibits this properly and we used it to improve the signal to noise ratio during recognition.

Figure 8:
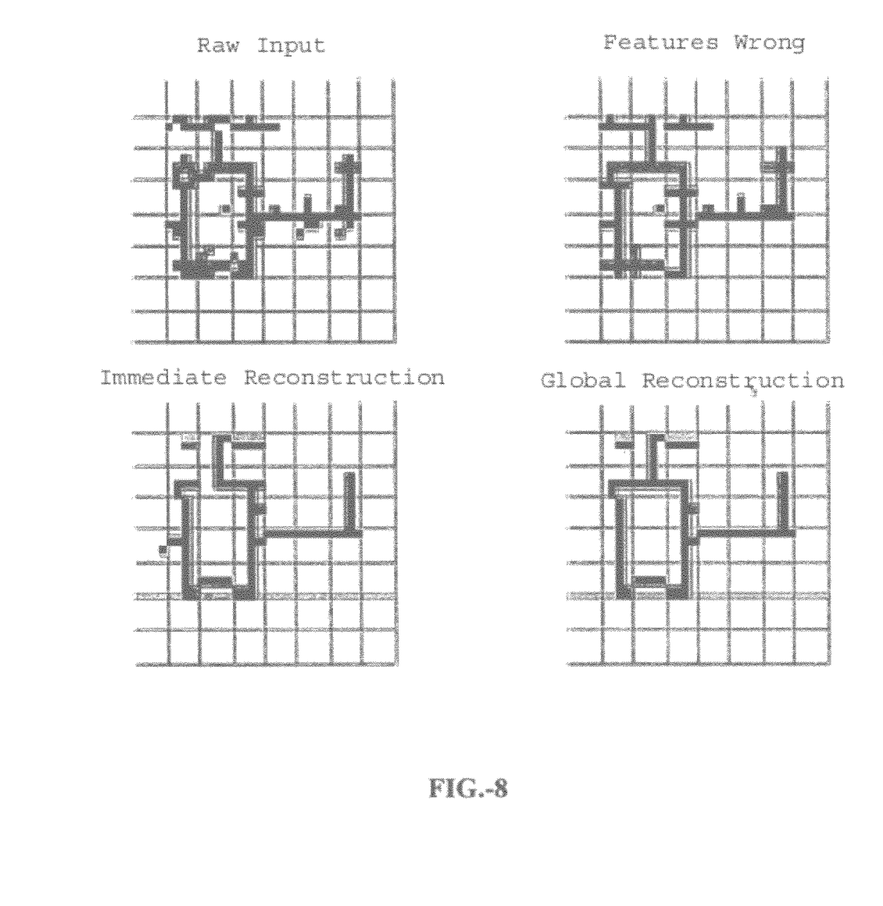
FIG. 8 is a series of images demonstrating the predictive capabilities of an exemplary system, and method according to one embodiment of the present invention.

A critical test for whether a system generalizes correctly would be to test whether it can correct noisy or missing inputs using its knowledge about the statistics of patterns. FIG. 8 shows sample results from a test of the example system and method. The raw input (top left) is very noisy and an immediate reconstruction using the Information in a 4×4 window has all the features wrong (top right). The intermediate reconstruction, (bottom left) is obtained by operating the belief propagation till the second level in the hierarchy and then passing the beliefs down to the lower level again. Thus the intermediate level reconstruction the statistics of patterns in an 8×8 neighborhood. The global reconstruction (bottom right) is obtained by doing the belief propagation globally. This reconstruction is consistent with the recognition of the input as a helicopter.

Figure 9:
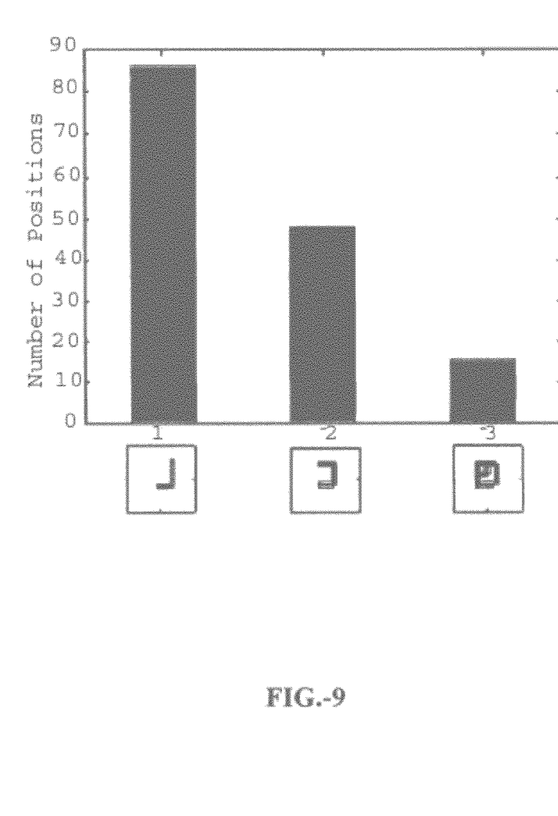
FIG. 9 is a bar chart showing the generalization performance of an exemplary visual recognition system according to one embodiment of the present invention.

FIG. 9 illustrates the excellent performance of this example system and method with regards to generalizing when trained on novel patterns. This example shows the system snapshots of 3 novel images at 10 randomly chosen, positions. What is plotted is the number of positions to which the system generalized for each of these novel images (shown along the X axis). It can be seen that the generalization performance goes down with increasing complexity of the novel pattern.

Generalization may occur in systems and methods according to the present invention due to the hierarchical memory and processing structure. Object representations at each level of the hierarchy are constructed from the same lower level components. After having seen many images, the lower levels of the system have "seen" everything that is there (sufficient statistic) in the visual world at the spatial and temporal scales of those modules. Thus, if a new pattern is to be learned, most of the lower level connections do not need to be changed at all for learning that pattern. The new pattern may be constructed of components that have already been observed and understood in the context of other, previously learned patterns and sequences.

Example 2

Recognition as Inference in a Bayesian Network

Various embodiments of the present invention advantageously recognize the continuity of time and utilize temporal data to interpret and solve problems that other systems may encounter with varying observational representations of invariant aspects of the experienced, environment. As an added advantage, the present invention also provides a Bayesian inference prediction framework that incorporates feedback from higher level modules in a hierarchical memory system to lower level modules. A memory or processing system and method in accordance with the present invention captures multiple temporal and spatial scales at the same time. This capability goes beyond the use of Hierarchical Hidden Markov Models (HHMMs) to capture structure at multiple scales either in space or in time. The invention may be applied to process data from visual, auditory, tactile and other sensory data as well as other types of previously recorded data.

Once the modules in the hierarchy have learned according to the algorithms described above, the result is a tree structured Bayesian Network, an example of which is shown in FIG. 5. In FIG. 5, the random variables at the bottom level nodes correspond to quantizations of input patterns. The random variables at intermediate levels represent object parts which move together persistently. The random variables at the top node correspond to objects. During training the definitions of the intermediate object parts and then the top-level objects are obtained using algorithms described above in regards to various embodiments of the present invention. The modules correspond to the nodes in a probabilistic graphical model and each node stores a conditional probability distribution (CPD). Every module can be thought of as having a set of states. The CPDs at each node encode the probability distribution of the states of that module given the state of its parent module.

Assuming that the learning algorithm has produced meaningful states at each module of the hierarchy with the states at the top of the hierarchy corresponding to object categories, then the recognition problem can be defined as follows: given any image I, find the most likely set of states at each module, die combination of which best explains the given image In a probabilistic sense. Specifically, if W is the set of all random variables corresponding to node states, then the most probable explanation for the image I is a set of instantiations w* of the random variables such that $$P(w^* \mid I) = \max_{w} P(w \mid I) \quad (4)$$

If Z is the random variable representing the states at the top of the hierarchy, then the category label that best explains any given image is the index of z*, where z* is the assignment to Z which maximized the above equation. Given an acyclic Bayesian Network such as may be generated according to this embodiment, inference may be performed using local message passing. Pearl's Bayesian Belief Propagation algorithm, or other similar techniques, algorithms, or methods like Clique Tree techniques, variable elimination may be used to obtain the most likely explanation given a sensory observation, such as for example a visual image, a sound or sounds, or other input data.

The foregoing description of specific embodiments and examples of the invention have been presented for the purpose of illustration and description, and although the invention has been illustrated by certain of the preceding examples. It is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

What is claimed is:

1. A computer system, comprising:
a processor;
two or more children processing modules, each of the two or more children processing modules configured to receive spatially different parts of the input data and generate first level characterization data that represents spatial patterns and temporal sequences in a received part of the input data based on correlation between the received part of the input data and the first level characterization data, the correlation established by a feedback signal; and
a parent processing module configured to receive the first level characterization data from the two or more children processing modules and output second level characterization data that represents spatial patterns and temporal sequences in the first level characterization data, the parent processing module providing feedback information to the two or more children processing modules.

2. The computer system of claim 1, wherein each child processing module is configured to generate the first level characterization data by identifying the spatial patterns and temporal sequences in the received part of the input data, and quantifying frequency of the spatial patterns and temporal sequences in the received part of the input data.

3. The computer system of claim 2, wherein the parent processing module is configured to generate the second level characterization data by identifying the spatial patterns and temporal sequences in the first level characterization data and quantifying frequency of the spatial patterns and temporal sequences in the first level characterization data.

4. The computer system of claim 2, wherein the feedback information comprises the second level characterization data generated by the parent processing module.

5. The computer system of claim 4, wherein each child processing module is configured to receive the feedback information from the parent processing module to generate and store the correlation between the first level characterization data and the second level characterization data.

6. The computer system of claim 5, wherein the correlation is represented by a conditional probability table.

7. The computer system of claim 1, wherein each child processing module is configured to store a transition of the first level characterization data and the feedback information.

8. The computer system of claim 7, wherein the correlation is represented by a conditional transition probability matrix.

9. The computer system of claim 1, further comprising two or more grandchildren processing modules, each grandchild processing module associated with at least one child processing module and configured to generate at least a part of the input data to the at least one child processing module.

10. The computer system of claim 1, wherein the two or more children processing modules and the parent processing module form a Bayesian belief network.

11. A computer-implemented method, comprising:
storing correlation between first level characterization data and second level characterization data, the first level characterization data generated at two or more children processing modules responsive to receiving different parts of first input data, the second level characterization data generated at a parent processing module responsive to receiving the first level characterization data from the two or more children processing modules, the correlation generated at the two or more children processing modules based on feedback received from the parent processing module;
generating first output at the two or more children processing modules based on the correlation responsive to each of the two or more children processing modules receiving different parts of second input data, the first output representing spatial patterns and temporal sequences in the second input data; and
generating second output at the parent processing module responsive to receiving the first output from the two or more children processing modules, the second output representing spatial patterns and temporal sequences in the first output data.

12. The method of claim 11, wherein the correlation is represented by a conditional probability matrix.

13. The method of claim 11, further comprising filling missing information in the second input data based on the conditional probability matrix.

14. The method of claim 11, wherein the second input data comprises video sequences, visual data, visual patterns or patterns with relative movements.

15. The method of claim 11, wherein the two or more children processing modules and the parent processing module form a Bayesian belief network.

* * * * *